United States Patent Office

Re. 26,433
Reissued Aug. 6, 1968

26,433

AMIDE AND IMIDE DERIVATIVES OF METAL SALTS OF SUBSTITUTED SUCCINIC ACIDS

William M. Le Suer, Cleveland, Ohio, assignor to The Lubrizol Corporation, Wickliffe, Ohio, a corporation of Ohio No Drawing. Original No. 3,163,603, dated Dec. 29, 1964, Ser. No. 329,860, Dec. 11, 1963. Application for reissue Oct. 27, 1967, Ser. No. 689,732
12 Claims. (Cl. 252—33.6)

Matter enclosed in heavy brackets [ ] appears in the original patent but forms no part of this reissue specification; matter printed in italics indicates the additions made by reissue.

*ABSTRACT OF THE DISCLOSURE*

*Oil-soluble metal salts of substituted succinic acid acylated aliphatic polyamines and processes for their preparation. These are exemplified by the alkali, alkaline earth, lead, cadmium, zinc, nickel and cobalt salts of polyisobutenyl-substituted succinic acid acylated alkylene polyamines. The salts are additives for lubricating compositions.*

This invention relates to new chemical compositions and to mineral oil compositions containing the same and, more particularly, it relates to a novel class of chemical compositions which act as dispersants, detergents and oxidation and corrosion inhibitors. Still more particularly this invention relates to amide and imide derivatives of metal salts of substituted succinic acids.

The prior art has shown a need for efficient dispersants to hold in suspension products caused by oxidation or deterioration of a motor oil during service life, as well as other insoluble particles so that they do not settle out and form varnish or sludge or interfere with the lubrication or functioning of the various mechanical parts. Also, dispersants are useful to hold in suspension additives for specific purposes which would otherwise be insoluble in the mineral oil.

The prior art has shown also the need for efficient oxidation and corrosion inhibitors to prevent or reduce the deposition of lacquer or varnish-like coatings on the walls of the cylinders, piston rings, etc., and to prevent or reduce the corrosion of engine parts, bearings, etc. An example of a specific purpose served by a corrosion inhibitor is the prevention of copper-lead bearing corrosion.

It is therefore an object of this invention to provide novel compositions of matter.

It is also an object of this invention to provide compositions which are adapted for use as additives in hydrocarbon oils.

It is also an object of this invention to provide compositions which are useful as dispersants and oxidation inhibitors in lubricating compositions.

It is also an object of this invention to provide compositions which are useful as dispersants and oxidation inhibitors in hydrocarbon oils.

It is another object of this invention to provide a novel process for the preparation of compositions useful as dispersants and oxidation inhibitors.

It is another object of this invention to provide improved lubricating compositions.

These and other objects of this invention are accomplished by providing an oil-soluble nitrogen-containing metal salt composition prepared by the process which comprises reacting, at a temperature within the range of from about 20° C. to about 250° C., (A) about two equivalents of a succinic compound selected from the class consisting of hydrocarbon-substituted succinic acids and hydrocarbon-substituted succinic anhydrides wherein the hydrocarbon substituent has at least about 50 aliphatic carbon atoms, (B) about one equivalent of a basic metal reactant selected from the class consisting of alkali metal, alkaline earth metal, lead, cadmium, and zinc oxides, hydroxides, carbonates and lower alcoholates and the combination of an alkali metal hydroxide and an inorganic metal salt selected from the class consisting of alkaline earth metal, lead, cadmium, zinc, nickel, and cobalt halides and nitrates, and (C) from one to about five equivalents of an amine selected from the class consisting of alkylene polyamines and hydroxy alkyl-substituted alkylene polyamines. In the usual case from about one to about two equivalents of amine is used.

The hydrocarbon-substituted succinic compounds of the oil-soluble nitrogen-containing metal salt compositions are readily obtainable from the reaction of maleic anhydride with a high molecular weight olefin or a chlorinated hydrocarbon or other high molecular weight hydrocarbon containing an activating polar substituent, i.e., a substituent which is capable of activating the hydrocarbon molecule in respect to the reaction with maleic anhydride or the acid thereof. Said reaction involves heating equivalent portions of the maleic anhydride and hydrocarbon, for example, at a temperature within the range of from about 100° C. to about 200° C. The resulting product is a hydrocarbon-substituted succinic anhydride. The succinic anhydride may be hydrolyzed to the corresponding acid by treatment with water or steam. The hydrocarbon-substituted succinic acid is preferred, for the purposes of this invention, when the basic metal reactant is reacted before the polyamine and the corresponding succinic anhydride is preferred when the polyamine is reacted before the basic metal reactant.

The principal sources of the hydrocarbon-substituted radical include the high molecular weight petroleum fractions and olefin polymers, particularly polymers of mono-olefins having from 2 to about 30 carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, are like useful. Such medial olefin polymers contemplated are those illustrated by 2-butene, 3-pentene, and 4-octene, etc.

Also useful are the interpolymers of the olefins such as those illustrated above with other interpolymerizable olefinic substances such as aromatic olefins, cyclic olefins, and poly-olefins. Such interpolymers include, for example, those prepared by polymerizing isobutene with styrene, isobutene and butadienes, propene with isoprene, ethylene with piperylene, isobutene with chloroprene, isobutene with p-methyl styrene, 1-hexene with 1,3-hexadiene, 1-octene with 1-hexene, 1-heptene with 1-pentane, 3-methyl-1-butene with 1-octene, 3,3-dimethyl-1-pentane with 1-hexene, isobutene with styrene and piperylene, etc.

The relative proportions of the mono-olefins to the other monomers in the interpolymers influence the stability and oil-solubility of the products of this invention. Thus, for reasons of oil-solubility and stability, the interpolymers contemplated for use in this invention should be substantially aliphatic and substantially saturated, i.e., they should contain at least about 80%, and preferably at least about 95%, on a weight basis of units derived from the aliphatic mono-olefins and no more than about 5% of olefinic linkages based on the total number of carbon-to-carbon covalent linkages. In most instances, the percent of olefinic linkages should be less than about 2% of the total number of carbon-to-carbon covalent linkages.

Specific examples of such interpolymers useful in this invention include the following (percent by weight): copolymer of 95% of isobutene with 5% of styrene, terpolymer of 98% of isobutene with 1% of piperylene and 1% of chloroprene, terpolymer of 95% of isobutene with 2% of 1-butene and 3% of 1-hexene, terpolymer of 60% of iso-butene with 20% of 1-pentene and 20% of 1-octene, copolymer of 80% of 1-hexene and 20% of 1-heptene, terpolymer of 90% of isobutene with 2% of cyclohexene and 8% of 1-heptene, terpolymer of 90% of isobutene with 2% of cyclohexene and 8% of propene, and copolymer of 80% of ethylene and 20% of propene.

Another source of the hydrocarbon substituent radicals includes saturated aliphatic hydrocarbons derived from highly refined high molecular weight white oils or synthetic alkanes such as are obtained by hydrogenation of high molecular weight olefin polymer illustrated above or high molecular weight olefinic substances.

The hydrocarbon substituent may contain polar substituents provided, however, that the polar substituents are not present in proportions suffiently large as to alter significantly the hydrocarbon character of the radical. The polar substituents contemplated are those exemplified by chloro, bromo, keto, aldehydo, ethereal, and nitro, etc. The upper limit with respect to the proportion of such polar substituents in the radical is approximately 10% based on the weight of the hydrocarbon portion of the radical.

Another important aspect of this invention is that the hydrocarbon substituent of the hydrocarbon-substituted succinic compound should be substantially saturated, i.e., at least about 95 percent of the total number of carbon-to-carbon covalent linkages are saturated linkages. An excessive proportion of unsaturated linkages renders the molecule susceptible to oxidation, deterioration, and polymerization and results in products unsuitable for use in hydrocarbon oils in many applications.

The size of the hydrocarbon substituent of the said succinic compound appears to determine the effectiveness of the additive of this invention as a dispersant in lubricating oils. It is critically important that said substituent be large, that is, that it have at least about 50 aliphatic carbon atoms in its structure. The molecular weight of the hydrocarbon substituent should be within the range of from about 700 to about 100,000. Olefin polymers having a molecular weight of from 750 to 5,000 are preferred. However, higher molecular weight olefin polymers having molecular weights from about 10,000 to about 100,000 are also useful and have been found to impart viscosity index improving properties to the nitrogen-containing metal salt compositions of this invention. In many instances, the use of such higher molecular weight olefin polymers is desirable.

The most common sources of these substantially aliphatic hydrocarbon substituents are the polyolefins such as polyethylene, polypropylene, polyisobutene, etc. A particularly preferred polyolefin is polyisobutene having a molecular weight of about 1,000.

The hydrocarbon-substituted succinic acids and anhydrides are especially preferred for use as the acid-producing reactant in this process for reasons of the particular effectiveness of the products obtained from such compounds as additives in hydrocarbon oils. Said succinic compounds are readily available from the reaction of maleic anhydride with a high molecular weight olefin polymer or a chlorinated olefin polymer described hereinabove. The reaction involves heating equivalent portions of the two reactants at a temperature within the range of from about 100° to about 200° C. The product from such a reaction is an alkenyl succinic anhydride. The alkenyl group may be hydrogenated to an alkyl group. Also, the anhydride may be hydrolyzed to the corresponding acid by treatment with water or steam.

As indicated earlier, in lieu of the high molecular weight olefin polymers or chlorinated hydrocarbons, other high molecular weight hydrocarbons containing an activating polar substituent, i.e., a substituent which is capable of activating the hydrocarbon molecule in respect to reaction with maleic acid or anhydride, may be used in the above reaction for preparing the succinic compounds. Such polar substituents are illustrated by sulfide, disulfide, nitro, mercaptan, bromine, ketone, and aldehyde radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polar-substituted hydrocarbon at a temperature usually within the range of from about 100° C. to about 200° C.

The metals of the metal salts useful in this invention are those metals selected from the class consisting of alkali metals, alkaline earth metals, zinc, cadmium, lead, cobalt, and nickel. Examples of metal compounds contemplated are the following: sodium oxide, sodium hydroxide, sodium carbonate, sodium methylate, sodium propylate, sodium pentylate, sodium phenoxide, potassium oxide, potasium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium carbonate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadminum oxide, cadmium hydroxide, cadmium carbonate, carmium methylate, cadmium propylate, cadmium chloride, cadmium bromide, cadmium fluoride, lead oxide, lead hydroxide, lead carbonate, lead ethylate, lead pentylate, lead chloride, lead fluoride, lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

The amines useful in this invention include alkylene polyamines and hydroxyalkyl-substituted alkylene polyamines.

A preferred source of the amine group consists of alkylene polyamines conforming for the most part to the formula $$H-\underset{\underset{A}{|}}{N}-\left(\text{alkylene-}\underset{\underset{A}{|}}{N}\right)_n-H$$

wherein n is an integer preferably less than about 10, A is a hydrocarbon radical or hydrogen radical or an amino hydrocarbon radical, and the alkylene radical is preferably a lower alkylene radical having less than about 8 carbon atoms. Specific amines which are contemplated are exemplified by: ethylene diamine, triethylene tetramine, propylene diamine, decamethylene diamine, octamethylene diamine, di(hepta-methylene)triamine, tripropylene tetramine, tetraethylene pentamine, trimethylene diamine, tetraethylene hexamine, di(trimethylene) triamine, 2-heptyl-3-(2-aminopropyl)imidazoline, 1,3-bis (2 - aminoethyl)imidazoline, pyrimidine, 1 - (2 - aminopropyl) piperazine, 1,4-bis(2-aminoethyl) piperazine, and 2-methyl-1-(2-aminobutyl) piperazine. Higher homologues such as are obtained by condensing two or more of the above illustrated alkylene amines are likewise useful.

Hydroxyalkyl-substituted alkylene polyamines, i.e., alkylene polyamines having 1 or more hydroxyalkyl substituents on a nitrogen atom, are likewise contemplated for use within this invention. The hydroxyalkyl-substituted alkylene polyamines are preferably those in which the alkyl group is a lower alkyl group, i.e., having less than about 6 carbon atoms. Examples of such amines include N-(2-hydroxyethyl)-ethylene diamine, N,N'-bis (2-hydroxyethyl)ethylene diamine, 1-(2-hydroxyethyl)-piperazine, lower hydroxypropyl-substituted diethylene triamine, di-hydroxypropyl-substituted tetraethylene pentamine, and N-3-hydroxypropyl)tetramethylene diamine.

Higher homologues such as are obtained by condensation of the above-illustrated alkylene amines are hydroxyalkyl-substituted alkylene amines through amino radicals or through hydroxy radicals are likewise useful. It will be appreciated that condensation through amino radicals results in a higher polyamine accompanied by removal of ammonia and that condensation to the hydroxyl radicals results in products containing ether linkages accompanied by removal of water.

The ethylene polyamines are especially useful in this invention. They are described in detail under the heading "Ethylene Amines" in "Encyclopedia of Chemical Technology," Kirk and Othmer, volume 5, pages 898–905, Interscience Publishers, New York (1950). Such compounds are prepared by the reaction of an alkylene chloride with ammonia which results in the production of complex mixtures of alkylene polyamines, including cyclic condensation products such as piperazines. These mixtures find use in the processes of this invention. On the other hand, quite satisfactory products may be obtained also by the use of pure alkylene polyamines. An especially useful alkylene polyamine for reasons of economy as well as the effectiveness of the products derived therefrom, is a mixture of ethylene polyamines prepared by the reaction of ethylene dichloride and ammonia and having a composition which, in its elemental analysis, corresponds to that of tetraethylene pentamine.

Another especially useful amine for reasons of economy as well as the effectiveness of the products derived therefrom is a mixture of poly(trimethylene) polyamines and the 1,3-trimethylene diamine derived from the reaction of acrolein and ammonia.

The process of this invention can be carried out either by (1) first preparing the acylated amine of the hydrocarbon-substituted succinic compound and then reacting said acylated amine with the basic metal compound, or by (2) first preparing the mono-metal salt of the hydrocarbon-substituted succinic compound and then reacting said mono-metal salt with an alkylene polyamine or hydroxyalkyl-substituted alkylene polyamine. In the first method, it is preferred that the succinic compound be the succinic anhydride and that trace amounts of water, i.e., up to about 2.5% by weight, be present when the basic metal compound is an oxide. In the second method, it is preferred that the succinic compound be the succinic acid. In all cases, it is preferred that nitrogen or some such inert gas be bubbled through the reaction mixtures to remove any water formed as a result of the acylation reaction.

The first method above involves (A) mixing a succinic compound selected from the class consisting of hydrocarbon-substituted succinic acids and hydrocarbon-substituted succinic anhydrides wherein the hydrocarbon substituent has at least about 50 aliphatic carbon atoms, with at least about one equivalent of an amine selected from the class consisting of alkylene polyamines and hydroxyalkyl-substituted alkylene polyamines, and heating the resulting mixture to effect acylation and to form an acylated amine, and to remove the water formed thereby, and then (B) mixing said acylated amine with about one equivalent of a basic metal compound from the class consisting of alkali metal, alkaline earth metal, zinc, cadmium and lead oxides, hydroxides, carbonates and lower alcoholates, and heating the resulting mixture at a temperature within the range of from about 20° C. to about 250° C. It is preferred that said acylation reaction be carried out at a temperature within the range of from about 80° C. to about 160° C. and for a period of time within the range of from about 3 hours to about 5 hours.

The second variant of the process comprises reacting, at a temperature within the range of from about 60° C. to about 250° C., (A) one equivalent of a mono-metal salt of a hydrocarbon-substituted succinic acid in which the hydrocarbon substituent has at least about 50 aliphatic carbon atoms and the metal of said metal salt is selected from the class consisting of alkali metals, alkaline earth metals, zinc, cadmium, nickel, cobalt, and lead, with (B) at least about one equivalent of an amine selected from the class consisting of alkylene polyamines and hydroxyalkyl-substituted alkylene polyamines.

The mono-metal salt may be prepared by heating at a temperature within the range of from about 80° C. to about 130° C., two equivalents of a hydrocarbon-substituted succinic acid with about one equivalent of a basic metal reactant selected from the class consisting of alkali metal, alkaline earth metal, lead, cadmium, and zinc oxides, hydroxides, carbonates and lower alcoholates, for a period of time of from about 1 hour to about 5 hours. The temperature can be as low as 20° C., although usually it should be within the range above. Also, it is preferred that the reaction of the mono-metal succinate with the amine is best carried out at a temperature within the range of from about 80° C. to about 160° C. It usually requires from about 3 to about 5 hours.

The mono-metal succinate may be prepared by double decomposition of an alkali metal succinate with an inorganic metal salt selected from the class consisting of alkaline earth metal, lead, cadmium, zinc, nickel and cobalt halides and nitrates.

The use of a solvent such as toluene, mineral oil, etc., is sometimes desirable.

The mono-metal succinates are illustrated by the structural formula:

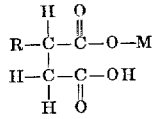

where R is a hydrocarbon substituent having at least about 50 aliphatic carbon atoms and M is one equivalent of an alkali metal, alkaline earth metal, lead, cadmium, zinc, nickel or cobalt.

The lower alcoholates referred to in this invention are alcoholates containing from one to about 16 carbon atoms. Examples of said alcoholates include methylates, ethylates, propylates, butylates, hexylates, etc.

The following examples illustrate the process of this invention:

Example 1

A polyisobutenyl succinic anhydride is prepared by the reaction of a chlorinated polyisobutylene (having an average chlorine content of 4.3 weight percent and an average of 70 carbon atoms) with maleic anhydride at about 200° C. The resulting polyisobutenyl succinic anhydride has an acid number of 103. To a mixture of 3,264 grams (6 equivalents) of this polyisobutenyl succinic anhydride, 2,420 grams of mineral oil and 75 grams of water, there is added at 80° to 100° C., 122.1 grams (3 equivalents) of zinc oxide. The addition is made portionwise over a period of 30 minutes. The mixture is maintained at a temperature of 90°–100° C. for a period of 3 hours. Thereupon, the mixture is heated to 150° C. and maintained at this temperature until it is essentially dry. The mixture is cooled to 100° C. and there is added 245 grams (6 equivalents) of an ethylene polyamine mixture having an average composition corresponding to that of tetraethylene pentamine and an equivalent weight of 40.8. The addition is made portionwise over a period of 30 minutes whereupon the mixture is heated to a temperature of 150°–160° C. and maintained at this temperature for 5 hours. Throughout the 5-hour period, nitrogen is bubbed through the mixture to remove water formed as a result of acylation. The residue is filtered. The resulting filtrate has a zinc content of 1.63% and a nitrogen content of 1.39%.

Example 2

To a mixture of 3,330 grams (6 equivalents) of a polyisobutenyl succinic anhydride (having an acid number of 101 and prepared, as in Example 1, from maleic anhydride and chlorinated polyisobutylene having an average chlorine content of 4.3 weight percent and an average of 71 carbon atoms), 2,386 grams of mineral oil and 75 grams of water, there is added, at 80–°90° C., 122 grams (3 equivalents) of zinc oxide. The addition is made portionwise over a 30-minute period. The mixture is maintaind at a temperature of 90°–105° C. for 4 hours. Thereupon, 122 grams (3 equivalents) of the amine mixture described in Example 1 is added portionwise over a period of 30 minutes while the temperature of the mixture is maintained at 105°–110° C. The mixture is heated at 205°–215° C. and maintained at this temperature for 4 hours. Throughout the 4-hour period, nitrogen is bubbled through the mixture to remove water formed as a result of acylation. The residue is filtered. The resulting filtrate has a zinc content of 1.64% and a nitrogen content of 0.72%.

Example 3

To a mixture of 3,750 grams (6 equivalents) of a polyisobutenyl succinic anhydride (having an acid number of 89.8 and prepared, as in Example 1, from maleic anhydride and chlorinated polyisobutylene having an average chlorine content of 4.3 weight percent and an average of 81 carbon atoms), 2,632 grams of mineral oil and 75 grams of water, there is added, at 80°–100° C., 60 grams (3 equivalents) of magnesium oxide. The addition is made portionwise over a 10-minute period. The mixture is maintained at a temperature of 100°–105° C. for 3 hours. Duuring the first part of this 3-hour period, 50 grams of water is added. Thereupon, 113 grams (3 equivalents) of an amine mixture such as described in Example 1 (but with an equivalent weight of 37.8) is added portionwise over a period of 30 minutes while the temperature of the mixture is maintained at 98°–100° C. The mixture is heated at 210°–215° C. and maintained at this temperature for 4 hours. Throughout the 4-hour period, nitrogen is bubbled through the mixture to remove water resulting from acylation. The residue is filtered. The filtrate has a magnesium content of 0.55%, based on sulfate ash, and a nitrogen content of 0.64%.

Example 4

To a mixture of 3,360 grams (6 equivalents) of a polyisobutenyl succinic anhydride (having an acid number of 101 and prepared, as in Example 1, from maleic anhydride and chlorinated polyisobutylene having an average chlorine content of 4.3 weight percent and an average of 67 carbon atoms), 2,285 grams of mineral oil and 81 grams of water, there is added, at 80°–95° C., 110 grams (2.9 equivalents) of calcium hydroxide. The addition is made portionwise over a 30-minute period. The mixture is maintained at a temperature of 90°–105° C. for 4 hours. Thereupon, 114 grams (3 equivalents) of an amine mixture such as described in Example 1 (but with an equivalent weight of 37.8) is added portionwise over a period of 30 minutes while the temperature of the mixture is maintained at 105°–110° C. The mixture is heated to 200°–230° C. and maintained at this temperature for 4 hours. Throughout the 4-hour period, nitrogen is bubbled through the mixture to remove water resulting from acylation. The residue is filtered. The filtrate has a calcium content of 3.4%, based on sulfate ash, and a nitrogen content of 0.71%.

Example 5

To a mixture of 3,210 grams (6 equivalents) of a polyisobutenyl succinic anhydride (having an acid number of 105 and prepared, as in Example 1, from maleic anhydride and chlorinated polyisobutylene having an average chlorine content of 4.3 weight percent and an average of 68 carbon atoms), 2,325 grams of mineral oil and 100 grams of water, there is added, at 80°–95° C., 122 grams (3 equivalents) of zinc oxide. The addition is made portionwise over a period of 15 minutes. The mixture is maintained at a temperature of 100°–110° C. for 4 hours. Thereupon, 209 grams (3.17 equivalents) of a mixture of poly(trimethylene)polyamines [comprising mostly N,N-di(3-aminopropyl)-N'(3-aminopropyl)-1,3-propane diamine and having an average molecular weight of 180 and a base number of 852] is added portionwise over a period of 30 minutes while the temperature of the mixture is maintained at 110°–130° C. The resulting mixture is heated at 150°–160° C. and maintained at this temperature for 3.5 hours. Throughout this 3.5-hour period nitrogen is bubbled through the mixture to remove water resulting from acylation. The residue is filtered. The filtrate has a zinc content of 1.69% and a nitrogen content of 0.67%.

Example 6

To a mixture of 3,330 grams (6 equivalents) of a polyisobutenyl succinic anhydride (having an acid number of 89.8 and prepared, as in Example 1, from maleic anhydride and a chlorinated polyisobutylene having an average chlorine content of 4.3 weight percent and an average of 81 carbon atoms), 2,386 grams of mineral oil and 75 grams of water, there is added, at 80°–85° C., 122 grams (3 equivalents) of zinc oxide. The addition is made portionwise over a 30-minute period. The mixture is maintained at a temperature of 90°–100° C. for 4.5 hours. Thereupon, 122 grams (3 equivalents) of the amine mixture described in Example 1 is added portionwise over a period of 30 minutes while the temperature of the mixture is maintained at 105°–110° C. The mixture is heated to 205°–215° C. and maintained at this temperature for an additional 4.5 hours. Throughout this 4.5-hour period, nitrogen is bubbled through the mixture to remove water resulting from acylation. The residue is filtered. The filtrate has a zinc content of 1.64% and a nitrogen content of 0.72%.

Example 7

To a mixture of 1,028 grams (2 equivalents) of a polyisobutenyl succinic anhydride (having an acid number of 109 and prepared, as in Example 1, from maleic anhydride and a chlorinated polyisobutylene having an average chlorine content of 4.3 weight percent and an average of 65 carbon atoms), 707 grams of mineral oil and 1,500 grams of benzene, there is added at 60° C., 41 grams (1 equivalent) of an amine mixture such as described in Example 1 (but with an equivalent weight of 41). The addition is made portionwise over a 30-minute period. The mixture is maintained at a temperature of 85°–90° C. for 7 hours. Throughout this 7-hour period, nitrogen is bubbled through the mixture to remove water resutling from acylation. To 1,034 grams of the above mixture and 52 grams of water, there is added 80°–90° C., 52 grams (0.67 equivalent) of barium oxide. The addition is made portionwise over a 30-minute period. The mixture is maintained at a temperature of 80°–90° C. for 2 hours. Thereupon, the mixture is heated to 150° C. and stripped of the last traces of water. The residue is filtered. The filtrate has a barium content of 3.9% and a nitrogen content of 0.76%.

Example 8

To a mixture of 3,740 grams (7.2 equivalents) of a polyisobutenyl succinic anhydride (having an acid number of 108 and prepared, as in Example 1, from maleic anhydride and chlorinate polyisobutylene having an average chlorine content of 4.3 weight percent and an average of 66 carbon atoms) and 2,610 grams of mineral oil, there is added at 60°–80° C., 220 grams (5,4 equivalents) of an amine mixture such as described in Example 1 (but with an equivalent weight of 40.7). The addition is made portionwise over a 1-hour period. The mixture is maintained at a temperature of 150°–155° C. for 5 hours. Throughout this 5-hour period, nitrogen is bubbled through the mixture to remove water resulting fram acylation. To 2,180 grams of the above mixture, 8 grams of mineral oil, and 25 grams of water, there is added at 80° C., 25 grams (0.68 equivalent) of calcium hydroxide. The addition is made portionwise over a 1-hour period. The mixture is maintained at a temperature of 80°–90° C. for two hours whereupon the mixture is heated to 150° C. and stripped of the last traces of water. The residue is filtered. The filtrate has a calcium content of 0.54% and a nitrogen content of 1.2%.

Example 9

To a mixture of 2,072 grams (4 equivalents) of a polyisobutenyl succinic anhydride (having an acid number of 108 and prepared, as in Example 1, from maleic anhydride and chlorinated polyisobutylene having an average chlorine content of 4.3 weight percent and an average of 66 carbon atoms) and 1,425 grams of mineral oil, there is added at 60°–80° C., 81 grams (2 equivalents) of an amine mixture such as described in Example 1 (but with an equivalent weight of 40.7). The addition is made portionwise over a 30-minute period. The mixture is maintained at a temperature of 150°–155° C. for 5 hours. Throughout this 5-hour period, nitrogen is bubbled through the mixture to remove water resulting from acylation. To 2,240 grams of the above mixture and 40 grams of water, there is added at 60° C., 39 grams (0.96 equivalent) of zinc oxide. The addition is made portionwise over a 30-minute period. The mixture is maintained at a temperature of 80°–90° C. for 4 hours whereupon the mixture is heated to 150° C. and stripped of the last traces of water. The residue is filtered. The filtrate has a zinc content of 1.3% and a nitrogen content of 0.84%.

Example 10

To a mixture of 3,620 grams (7 equivalents) of a polyisobutenyl succinic anhydride (having an acid number of 108 and prepared, as in Example 1, from maleic anhydride and chlorinated polyisobutylene having an average chlorine content of 4.3 weight percent and an average of 66 carbon atoms) and 2,490 grams of mineral oil, there is added at 60°–80° C., 143 grams (3.5 equivalents) of an amine mixture such as described in Example 1 (but with an equivalent weight of 40.7). The addition is made portionwise over a 1-hour period. The mixture is maintained at a temperature of 150°–155° C. for 5 hours throughout which period nitrogen is bubbled through the mixture to remove water resulting from acylation. To 2,170 grams of the above mixture, 84 grams of water, and 46 grams of mineral oil, there is added at 60°–80° C., 84 grams (1.1 equivalents) of barium oxide. The addition is made portionwise over a 30-minute period. The mixture is maintained at a temperature of 80°–90° C. for 2 hours whereupon the mixture is heated to 150° C. and stripped of the last traces of water. The residue is filtered. The filtrate has a barium content of 3% and a nitrogen content of 0.76%.

Example 11

To a mixture of 3,540 grams (6 equivalents) of a polyisobutenyl succinic anhydride (having an acid number of 95 and prepared, as in Example 1, from maleic anhydride and a chlorinated polyisobutylene having an average chlorine content of 4.3 weight percent and an average of 76 carbon atoms), 2,538 grams of mineral oil and 75 grams of water, there is added at 80° C., 208 grams (3 equivalents) of potassium carbonate. The addition is made portionwise over a 30-minute period. The mixture is maintained at a temperature of 95°–105° C. for 4 hours whereupon 120 grams (3 equivalents) of an amine mixture such as described in Example 1 (but with an equivalent weight of 40) is added portionwise over a period of 30 minutes while the temperature of the mixture is maintained at 110°–115° C. The mixture is heated to 170°–185° C. and maintained at this temperature for 4 hours. Throughout this 4-hour period nitrogen is bubbled through the mixture to remove water resulting from acylation. The residue is filtered. The filtrate has a potassium content of 1.56 percent and a nitrogen content of 0.70 percent.

Example 12

To a mixture of 4,200 grams (6 equivalents) of a polyisobutenyl succinic anhydride (having an acid number of 80 and prepared, as in Example 1, from maleic anhydride and chlorinated polyisobutylene having an average chlorine content of 4.3 weight percent and an average of 92 carbon atoms) and 2,930 grams of mineral oil, there is added at 80° C., 390 grams of 1-(2-hydroxyethyl)piperazine. The addition is made portionwise over a 30-minute period and the resulting mixture is maintained at a temperature of 180°–205° C. for 5 hours. Throughout the 5-hour period, nitrogen is bubbled through the mixture to remove water resulting from acylation. To the above mixture, combined with 35 grams of water, there is added at 30° C., 159 grams (3 equivalents) of sodium carbonate. The addition is made portionwise over a 45-minute period. The temperature is maintained at 70°–80° C. for 3 hours whereupon the mixture is heated to 150° C. and stripped of the last traces of water. The residue is filtered. The filtrate has a sodium content of 0.88 percent and a nitrogen content of 1.1 percent.

Example 13

To a mixture of 524 grams (1 equivalent) of a polyisobutenyl succinic anhydride (having an acid number of 107 and prepared, as in Example 1, from maleic anhydride and chlorinated polyisobutylene having an average chlorine content of 4.3 weight percent and an average of 66 carbon atoms), 365 grams of mineral oil and 20 grams of water, there is added at 80°–100° C., 21 grams (0.5 equivalent) of lithium hydroxide. The addition is made portionwise over a 15-minute period. The mixture is maintained at a temperature of 100°–110° C. for 4 hours whereupon 20.4 grams (0.5 equivalent) of an amine mixture such as described in Example 1 is added portionwise over a 30-minute period while the temperature of the mixture is maintained at 110°–135° C. The mixture is heated to 150°–160° C. and held there for 3.5 hours. Throughout the 3.5-hour period, nitrogen is bubbled through the mixture to remove water resulting from acylation. The residue is filtered. The filtrate has a lithium content of 0.25 percent and a nitrogen content of 0.80 percent.

Example 14

To a mixture of 523 grams (1 equivalent) of a polyisobutenyl succinic anhydride (having an acid number of 107 and prepared, as in Example 1, from maleic anhydride and chlorinated polyisobutylene having an average chlorine content of 4.3 weight percent and an average of 66 carbon atoms) and 370 grams of mineral oil, there is added at 70° C., 21 grams (0.5 equivalent) of an amine mixture such as described in Example 1 (but with an equivalent weight of 40.5). The addition is made portionwise over a 15-minute period whereupon 10 grams of water, and then 20 grams (0.5 equivalent) of zinc oxide, are added while the mixture is maintained at 80° C. The mixture is heated first at 100°–110° C. for 4 hours, then at 150°–160° C. for 6 hours. Nitrogen is bubbled into the mixture throughout the 6-hour period to remove water resulting from acylation. The residue is filtered. The filtrate has a zinc content of 0.84 percent and a nitrogen content of 0.80 percent.

Example 15

To a mixture of 5.44 grams (1 equivalent) of a polyisobutenyl succinic anhydride (having an acid number of 103 and prepared, as in Example 1, from maleic anhydride and chlorinated polyisobutylene having an average chlorine content of 4.3 weight percent and an average of 70 carbon atoms) and 380 grams of mineral oil, there is added at 20°–25° C., 43 grams (0.5 equivalent) of magnesium methylate. The addition is made portionwise over a 30-minute period. The mixture is maintained at a temperature of 60°–75° C. for 3 hours whereupon 20.4 grams (0.5 equivalent) of an amine mixture such as described in Example 1 is added portionwise over a 30-minute period while the temperature is maintained at 75° C. The mixture is heated at 160°–175° C. for 4 hours. Throughout this 4-hour period, nitrogen is bubbled into the mixture to remove water resulting from acylation. The residue is filtered. The filtrate has a magnesium content of 0.85 percent and a nitrogen content of 0.72 percent.

Example 16

To a mixture of 609 grams (1 equivalent) of a polyisobutenyl succinic anhydride (having an acid number of 92 and prepared, as in Example 1, from maleic anhydride and chlorinated polyisobutylene having an average chlorine content of 4.3 weight percent and an average of 79 carbon atoms) and 426 grams of mineral oil, there is added at 35°–40° C., 20.8 grams (0.5 equivalent) of an amine mixture such as described in Example 1 (but with an equivalent weight of 41.6). The addition is made portionwise over a 30-minute period and the mixture is maintained for 5 hours thereafter at a temperature of 165°–180° C. Throughout this 5-hour period nitrogen is bubbled into the mixture to remove water resulting from acylation. Thereupon, 63 grams (0.5 equivalent) of potassium pentylate is added over a 30-minute period while the temperature of the mixture is maintained at 60°–65° C. The mixture is maintained at a temperature of 85°–95° C. for 3.5 hours. The mixture then is heated to 150° C. and stripped of the water and alcohol. The residue is filtered. The filtrate has a potassium content of 1.1 percent and a nitrogen content of 0.65 percent.

Example 17

To a mixture of 982 grams (2 equivalents) of a polyisobutenyl succinic anhydride (having an acid number of 114 and prepared, as in Example 1, from maleic anhydride and chlorinated polyisobutylene having an average chlorine content of 4.3 weight percent and an average of 62 carbon atoms), 605 grams of mineral oil and 20 grams of water, there is added at 95°–98° C., 50 grams (1 equivalent) of calcium carbonate. The addition is made portionwise over a 45-minute period and the mixture is maintained for 7.5 hours thereafter at a temperature of 120°–145° C. Then 67 grams (1 equivalent) of an amine mixture such as described in Example 5 is added portionwise over a 30-minute period while the temperature of the mixture is maintained at 115°–125° C. The mixture is heated to 165°–175° C. and maintained at this temperature for 4 hours. Throughout this 4-hour period nitrogen is bubbled into the mixture to remove water resulting from acylation. The residue is filtered. The filtrate has a calcium content of 0.9 percent and a nitrogen content of 0.71 percent.

Example 18

To a mixture of 3,150 grams (6 equivalents) of a polyisobutenyl succinic anhydride (having an acid number of 107 and prepared, as in Example 1, from maleic anhydride and chlorinated polyisobutylene having an average chlorine content of 4.3 weight percent and an average of 66 carbon atoms), 284 grams of mineral oil and 100 grams of water, there is added at 80°–100° C., 122 grams (3 equivalents) of zinc oxide. The addition is made portionwise over a period of 15 minutes. The mixture is maintained at a temperature of 100°–110° C. for 4 hours whereupon 198 grams (3 equivalents) of an amine mixture such as described in Example 5 is added portionwise over a period of 30 minutes. The mixture is heated to 150°–160° C. and held there for 3.5 hours. Throughout this 3.5-hour period, nitrogen is bubbled into the mixture to remove water resulting from acylation. The residue is filtered. The filtrate has a zinc content of 1.77 and a nitrogen content of 0.75%.

Example 19

To a mixture of 524 grams (1 equivalent) of a polyisobutenyl succinic anhydride (having an acid number of 107 and prepared, as in Example 1, from maleic anhydride and chlorinated polyisobutylene having an average chlorine content of 4.3 weight percent and an average of 66 carbon atoms), 500 grams of toluene and 10 grams of water, there is added at 80° C., 20 grams (0.5 equivalent) of sodium hydroxide. The addition is made portionwise over a period of 15 minutes. The mixture is maintained at a temperature of 80°–85° C. for 1 hour and the mixture then is dried by heating at 110°–115° C. for 1 hour. Then 59.3 grams (0.5 equivalent) of nickel chloride hexahydrate is added portionwise over a period of 30 minutes, at 80°–90° C. This temperature is maintained for 6 hours, then the mixture is heated at 115°–120° C. for 6 hours. The mixture is filtered and the filtrate treated with 306 grams of mineral oil and 17.8 grams (0.44 equivalent) of an amine mixture such as described in Example 1. The resulting mixture is heated at 150°–160° C. for 3.5 hours, during which time nitrogen is bubbled through the mixture to remove water resulting from acylation. The residue is filtered. The filtrate has a nickel content of 0.69 percent and a nitrogen content of 0.82 percent.

Example 20

To a mixture of 990 grams (2 equivalents) of a polyisobutenyl succinic anhydride (having an acid number of 113 and prepared, as in Example 1, from maleic anhydride and chlorinated polyisobutylene having an average chlorine content of 4.3 weight percent and an average of 62 carbon atoms), 694 grams of mineral oil and 20 grams of water, there is added at 30° C., 69 grams (1 equivalent) of potassium carbonate. The addition is made portionwise over a period of 15 minutes. The mixture is heated at 85°–95° C. for 1 hour and then dried by heating at 135°–145° C./50 mm. for 1 hour. Thereupon, 160 grams (1 equivalent) of cobaltous nitrate hexahydrate is added portionwise over a period of 45 minutes while the temperature of the mixture is maintained at 90°–95° C. The mixture then is heated at 130°–150° C. for 9 hours and filtered. The filtrate is treated with 66 grams (1 equivalent) of an amine mixture such as described in Example 5. The addition is made portionwise over a 30-minute period while the temperature is maintained at 120°–125° C. The mixture is then heated at 175°–185° C. for 4 hours throughout which period nitrogen is bubbled into the mixture to remove water resulting from acylation. The residue is filtered. The filtrate has a cobalt content of 1.34% and a nitrogen content of 0.66%.

Example 21

To a mixture of 1,180 grams (2 equivalents) of a polyisobutenyl succinic anhydride (having an acid number of 95 and prepared, as in Example 1, from maleic anhydride and chlorinated polyisobutylene having an average chlorine content of 4.3 weight percent and an average of 76 carbon atoms) and 826 grams of mineral oil, there is added at 25° C., 54 grams (1 equivalent) of sodium methylate. The addition is made portionwise over a 15-minute period and the mixture then is maintained at a temperature of 85°–90° C. for 1 hour. Thereupon, 109 grams (1 equivalent) of nickel bromide is added portionwise over a period of 30 minutes at 95°–105° C., after which the mixture is heated at 145°–160° C. for 8 hours. The mixture is filtered and the filtrate treated with 66 grams (1 equivalent) of an amine mixture such as described in Example 5. The addition is made portionwise over a 30-minute period while the temperature is maintained at 80–85° C. The mixture then is heated at 150°–160° C. for 3.5 hours throughout which period nitrogen is bubbled into the mixture to remove water resulting from acylation. The residue is filtered. The filtrate has a nickel content of 1.12% and a nitrogen content of 0.56%.

Example 22

To a mixture of 1,245 grams (2 equivalents) of a polyisobutenyl succinic anhydride (having an acid number of 90 and prepared, as in Example 1, from maleic anhydride and chlorinated polyisobutylene having an average chlorine content of 4.3 weight percent and an average of 81 carbon atoms), 871 grams of mineral oil and 25 grams of water, there is added at 80° C., 56 grams (1 equivalent) of potassium hydroxide. The addition is made portionwise over a 30-minute period, after which the mixture is held at 85°–95° C. for 1 hour, then dried by heating at 135°–140° C. for 1 hour. Thereupon, 104.2 grams (1 equivalent) of barium chloride is added portionwise over a period of 30 minutes, with the temperature at 80°–90° C. The mixture then is heated at 130°–140° C. for 9 hours, and filtered. To the filtrate there is added 41 grams (1 equivalent) of an amine mixture such as described in Example 1 (but with an equivalent weight of 41). The addition is made portionwise over a 30-minute period, with the temperature at 110°–140° C. The mixture then is heated at 160°–165° C. for 4 hours, throughout which period nitrogen is bubbled into the mixture to remove water resulting from acylation. The residue is filtered. The filtrate has a barium content of 2.7% and a nitrogen content of 0.61%.

Example 23

To a mixture of 1,046 grams (2 equivalents) of a polyisobutenyl succinic anhydride (having an acid number of 107 and prepared, as in Example 1, from maleic anhydride and chlorinated polyisobutylene having an average chlorine content of 4.3 weight percent and an average of 66 carbon atoms) and 732 grams of mineral oil, there is added at 60° C., 82 grams (1 equivalent) of sodium propylate. The addition is made portionwise over a period of 15 minutes and the mixture then is heated at 80°–90° for 1.5 hours. Thereupon, 122 grams (1 equivalent) of zinc nitrate trihydrate is added portionwise over a period of 30 minutes while the temperature of the mixture is maintained at 90°–100° C. The mixture then is heated at 100°–105° C. for 9 hours and filtered, whereupon 66 grams (1 equivalent) of an amine mixture such as described in Example 5 is added. The addition is made portionwise over a 30-minute period with the temperature at 110°–120° C. Finally, the mixture is heated at 150°–160° C. for 4 hours while nitrogen is bubbled into the mixture to remove water resulting from acylation. The residue is filtered. The filtrate has a zinc content of 1.4% and nitrogen content of 0.62%.

Example 24

To a mixture of 400 grams (0.81 equivalent) of a polyisobutenyl succinic anhydride (having an acid number of 113 and prepared, as in Example 1, from maleic anhydride and a chlorinated polyisobutylene having an average chlorine content of 4.3 weight percent and an average of 62 carbon atoms) and 84 grams of toluene, there is added 19.5 grams (0.445 equivalent) of an amine mixture such as described in Example 1 (but with an equivalent weight of 43.8). The mixture is heated at 120° C. for 2.5 hours and then is cooled to 90° C., whereupon 5 grams of water, and then 34 grams (0.44 equivalent) of barium oxide are added. The mixture then is heated at 90°–100° C. for 2 hours and 298 grams of mineral oil added. The temperature is raised to 160° C. and nitrogen bubbled through until the mixture is dry. The residue is filtered. The filtrate has a barium content of 3.05 percent and a nitrogen content of 0.94 percent.

Example 25

To a mixture of 1,200 grams (2.42 equivalents) of a polyisobutenyl succinic anhydride (having an acid number of 113 and prepared, as in Example 1, from maleic anhydride and a chlorinated polyisobutylene having an average chlorine content of 4.3 weight percent and an average of 62 carbon atoms) and 888 grams of mineral oil, there is added 58 grams (1.325 equivalents) of an amine mixture such as described in Example 1 (but with an equivalent weight of 43.8). The mixture is heated at 110°–120° C. for 2 hours and then cooled to 85° C. Next, 25 grams of water, then 102 grams (1.33 equivalents) of barium oxide are added. The mixture then is heated at 90°–100° C. for 2 hours, then nitrogen is bubbled through at 160° C. until the mixture is dry. The residue is filtered. The filtrate has a barium content of 3.0 percent and a nitrogen content of 0.93 percent.

Example 26

To a mixture of 397 grams (0.8 equivalent) of a polyisobutenyl succinic anhydride (having an acid number of 113 and prepared, as in Example 1, from maleic anhydride and a chlorinated polyisobutylene having an average chlorine content of 4.3 weight percent and an average of 62 carbon atoms) and 100 grams of toluene, there is added at 54°–70° C., 12 grams (0.4 equivalent) of ethylene diamine. The addition is made portionwise over a 15-minute period and the mixture then heated to 115° C. where the azeotrope of toluene and water (resulting from acylation) is collected. The residue is heated at 138° C. for 1 hour. To 204 grams thereof, mixed with 200 grams of mineral oil and 4 grams of water, there is added at 70° C., 7.7 grams (0.01 equivalent) of barium oxide. This mixture is heated to 150° C. over a 1-hour period and held at 145°–150° C. for 2 hours. The residue is filtered. The filtrate has a barium content of 0.4 percent and a nitrogen content of 0.79 percent.

Example 27

To a mixture of 400 grams (0.81 equivalent) of a polyisobutenyl succinic anhydride (having an acid number of 113 and prepared, as in Example 1, from maleic anhydride and a chlorinated polyisobutylene having an average chlorine content of 4.3 weight percent and an average of 62 carbon atoms) and 84 grams of toluene, there is added 19.5 grams (0.41 equivalent) of an amine mixture such as described in Example 1 (but with an equivalent weight of 43.8). The mixture is heated at 120° C. for 2.5 hours, then cooled to 90° C. and to this mixture, 5 grams of water, and then 12.5 grams (0.45 equivalent) of calcium oxide are added. The mixture is heated at 90°–100° C. for 2 hours and then diluted with 285 grams of mineral oil. The mixture is then treated with nitrogen at 160° C. to remove the toluene and water, then filtered. The filtrate has a calcium content of 0.89% and a nitrogen content of 1.03%.

When used as lubricant additives, the compositions of this invention are usually present in lubricating oils in amounts ranging from about 0.5% to about 20% by weight. The optimum amount of said composition depends to a large extent upon the type of service to which the lubricating composition is to be subjected.

For example, lubricating compositions for use in gasoline internal combustion engines may contain from about 0.8 to about 4% by weight of the product of the invention whereas lubricating compositions for use in differential housings and diesel engines may contain as much as 15% or even more of the additive.

This invention contemplates also the use of other additives with the products of this invention in lubricating compositions. Such additives include, for example, detergents of the ash-containing type, detergents of the ashless-containing type, oxidation inhibiting agents, corrosion inhibiting agents, viscosity index improving agents, pour point depressing agents, extreme pressure agents, color stabilizers and anti-foam agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g. polyisobutene having a molecular weight of 750–5,000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium lithium, calcium magnesium, strontium, and barium.

The basic salts are those salts containing larger amounts of metal than present in stoichiometric organic acid radical salts. The most common method for preparing said basic salts involves heating a mineral oil solution of an acid with a stoichiometric excess of a metal neutralizing agent in the present of a "promoter." The most common metal neutralizing agents are those of metal oxide, hydroxide, carbonate, bicarbonate or sulfide. Examples of promoters include phenolic compounds, alcohols, glycols, and amines. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200° C.

Extreme pressure agents and oxidation-inhibiting and corrosion-inhibiting agents are exemplified by chlorinated aliphatic hydrocarbons, organic sulfides and polysulfides, phosphosulfurized hydrocarbons, phosphorus esters including dihydrocarbons and trihydrocarbon phosphites, metal thiocarbamates and metal phosphorodithioates.

Pour point depressing agents are illustrated by polymers of ethylene, propylene, or isobutene and poly(alklymethacrylates). Anti-foam agents include polymeric alkyl siloxanes, poly(alkylmethacrylates), and the condensation product of alkylphenol with formaldehyde and an amine.

The following examples are illustrative of lubricating compositions of this invention (all percentages are by weight):

Example A

SAE 30 mineral lubricating oil containing 3.1% of the product of Example 1, 0.075% of phosphorus as the zinc salt of a phosphorodithioic acid prepared by the reaction of phosphorus pentasulfide with a mixture of 65% (mole) of isobutyl alcohol and 35% (mole) of mixed primary-amyl alcohols, and 0.003% of a poly-(alkyl siloxane) anti-foam agent.

Example B

SAE 10 mineral lubricating oil containing 3.1% of the product of Example 1, 5.5% of a copolymer of alkyl methacrylate and N-vinyl pyrrolidone, and 0.075% of phosphorus as the zinc salt of a phosphorodithioic acid prepared by the reaction of phosphorus pentasulfide with a mixture of 65% (mole) of isobutyl alcohol and 35% (mole) of mixed primary-amyl alcohols.

Example C

SAE 30 mineral lubricating oil containing 2.1% of the product of Example 2, 11% of a basic calcium sulfonate obtained by carbonating a mineral oil solution of a calcium polydodecyl-benzene sulfonate and an excess of calcium hydroxide in the presence of an aqueous alcohol, 0.08% of anthranilic acid, 2% of a basic barium sulfonate obtained by carbonating a mineral oil solution of a barium petroleum sulfonate and an excess of barium hydroxide in the presence of a phenolic compound, 2% of a calcium salt derived from the condensation of a heptylphenol, calcium hydroxide and para-formaldehyde carried out in the presence of a base and in a mineral oil solution, 0.002% of a poly-(alkyl siloxane) anti-foam agent.

Example D

SAE 30 mineral lubricating oil containing 3.1% of the product of Example 2, 0.075% of phosphorus as the zinc salt of a phosphorodithioic acid prepared by the reaction of phosphorus pentasulfide with a mixture of 65% (mole) of isobutyl alcohol and 35% (mole) of mixed primary-amyl alcohols, and 0.003% of a poly-(alkyl siloxane) anti-foam agent.

Example E

SAE 20 mineral lubricating oil containing 3.3% of the product of Example 2, 0.075% of phosphorus as a zinc salt of a phosphorodithioic acid prepared by the reaction of phosphorus pentasulfide with a mixture of 65% (mole) of isobutyl alcohol and 35% (mole) of mixed primary-amyl alcohols, and 0.003% of a poly-(alkyl siloxane) anti-foam agent.

Example F

SAE 30 mineral lubricating oil containing 15% of the product of Example 3, 0.12% of phosphorus as a zinc salt of a phosphorodithioic acid obtained by the reaction of phosphorus pentasulfide with iso-octyl alcohol, and 0.003% of a poly-(alkyl siloxane) anti-foam agent.

Example G

SAE 30 mineral lubricating oil containing 2.1% of the product of Example 5, 11% of a basic calcium sulfonate obtained by carbonating a mineral oil solution of a calcium polydodecyl-benzene sulfonate and an excess of calcium hydroxide in the presence of an aqueous alcohol, 0.075% of anthranilic acid, 2.1% of a basic barium sulfonate obtained by carbonating a mineral oil solution of a barium petroleum sulfonate and an excess of barium hydroxide in the presence of a phenolic compound, 2% of a calcium salt derived from the condensation of a heptylphenol, calcium hydroxide and para-formaldehyde carried out in the presence of a base and in a mineral oil solution, and 0.002% of a poly-(alkyl siloxane) anti-foam agent.

Example H

SAE 20 mineral lubricating oil containing 1.4% of the product of Example 6, 0.075% of phosphorus as the zinc salt of a phosphorodithioic acid prepared by the reaction of phosphorus pentasulfide with a mixture of 65% (mole) of isobutyl alcohol and 35% (mole) of mixed primary-amyl alcohols, 1.2% of a barium detergent prepared by neutralizing with barium oxide, in the presence of a phenolic compound, the hydrolyzed reaction product of a polypropylene with phosphorus pentasulfide, and 0.003% of a poly-(alkyl siloxane) anti-foam agent.

Example I

SAE 20 mineral lubricating oil containing 3% of the product of Example 24, 0.0075% of phosphorus as the zinc salt of a phosphorodithioic acid prepared by the reaction of phosphorus pentasulfide with a mixture of 65% (mole)

of isobutyl alcohol and 35% (mole) of mixed primary amyl alcohols, and 0.003% of a poly-(alkyl siloxane) anti-foam agent.

The above lubricating compositions are merely illustrative and the scope of the present invention is not to be considered as limited by them, but is intended to include the use of all of the additives previously illustrated as well as others within the broad concept of the invention described herein.

The utility of the dispersant additives of the invention is shown by the results and evaluation of a modified version of the CRC–EX–3 engine test (ordinarily this engine test lasts for 96 hours; the modified version lasts for 144 hours). The test is recognized in the lubricating field as an important test by which lubricants can be evaluated for use under light duty service conditions. In this particular test, a lubricant is used in the crankcase of a 1954, 6-cylinder Chevrolet Powerglide engine for 144 hours under recurring cycling conditions. Each cycle consists of the following: (A) 2 hours at an engine speed of 500±25 r.p.m. under 0 load at an oil sump temperature of 100°–125° F., and an air-fuel ratio of 01:1;(B) 2 hours at an engine speed of 2500±25 r.p.m. under a load of 40 brake-horsepower at an oil sump temperature of 160°–170° F., and an air-fuel of 16:1; (C) 2 hours at an engine speed of 2500±25 r.p.m. under a load of 40 brake-horsepower at an oil sump temperature of 240°–250° —F., and an air-fuel ratio of 16:1.

At the end of the test, the engine is dismantled and inspected for sludge and varnish in accordance with the CRC deposit rating system. The rating is based on (1) the extent of piston ring-filling, (2) the amount of sludge formed in the engine (on a scale of 80–0, 80 being indicative of no sludge and 0 being indicative of extremely heavy sludge), and (3) the total amount of engine deposits, i.e., sludge and varnish, formed in the engine (on a scale of 100–0, 100 being indicative of no deposts and 0 being indicative of extremely heavy deposits). The utility of the invention as a dispersant is shown by the following results:

TABLE I

| Lubricant Tested | Percent Piston Ring-Filling | Sludge Rating | Total Deposit Rating |
|---|---|---|---|
| (1) Example E | 1 | 77.9 | 96.7 |
| (2) Example H | 1 | 77.3 | 95.1 |
| (3) Example I | 2 | 71.7 | 90.0 |

Further illustration of the usefulness of the products of this invention as dispersants in motor oils is gained from testing in a 5⅛" bore, single-cylinder Caterpillar Diesel test engine equipped with the EX 7999 High Speed Changeover Group and operated at a constant speed and B.t.u. input. This test is recognized in the field as an important test to determine the effect of an engine oil on ring sticking, wear, and the accumulation of piston deposits in a 480-hour endurance run. The lubricant is changed at 120-hour intervals; the test lasts 480 hours. The conditions of the testing operation are as follows:

| | |
|---|---|
| Speed | 1800±10 r.p.m. |
| Load | 40 B.H.P. |
| Fuel (0.4% sulfur) | 5850±B.t.u./min., 0.3 lbs./min. |
| Oil sump temperature | 205±5° F. |
| Intake air temperature | 255±5° F. |
| Intake air pressure | 53.0±0.3" Hg abs. |

The piston is evaluated at 120-hour intervals for percent top groove filling and deposits on lands, grooves, groove sides, ring sides, skirt, crown, and under the piston crown (on a scale of 100–0, 100 being indicative of no deposits and 0 being indicative of extremely heavy deposits). The utility of this invention as a dispersant is shown by this test with Example C, which showed a rating of 1% top groove filling and a total deposit rating of 94 for the 120-hour period; 9% top groove filling and a total deposit rating of 90.5 for the 360-hour period; and 8% top groove filling and a total deposit rating of 90 for the 480-hour completed cycle.

The utility of the composition invention as an oxidation and corrosion inhibitor is shown by the results of an oxidation and bearing corrosion test (Tentative Standard Method 3405–T of Federal Test Method Standard No. 791). This test involves the continuous operation of a single-cylinder CLR Oil Test Engine under constant speed, air-fuel ratio, and fuel flow conditions for a total of 40 hours. Before the test, the engine is thoroughly cleaned, pertinent measurements of engine parts are taken and a complete set of new piston rings and new copper-lead connecting rod test bearing inserts are installed. The lubricant is evaluated with respect to stability or resistance to oxidation, copper-lead bearing corrosion, and a deposition of varnish and/or sludge on engine parts. The test does not evaluate the dispersant and detergent characteristics of the lubricant. The lubricant is used in the crankcase of a single cylinder, 3.8" bore, 3.75" stroke, and 45.5" displacement engine for 40 hours under the following conditions:

| | |
|---|---|
| Speed, r.p.m. | 3150±25. |
| Air-fuel ratio | 14.0±0.5 to 1. |
| Oil sump temperature | 290° F.±2° F. |
| Fuel flow, lbs./hr. | 4.75±0.25. |
| Load | Adjust to provide proper fuel flow at specified air-fuel ratio. |

After completion of the test, the piston is rated for piston skirt varnish (on a scale of 10–0, 10 being indicative of no varnish and 0 being indicative of maximum amount of varnish) and the copper-lead bearing is evaluated for weight loss (a loss of less than 50 milligrams is indicative of a superior lubricant). The utility of the composition of this invention as a corrosion and oxidation inhibitor is shown by this test with Example D and shows a piston skirt varnish rating of 9.9 and a copper-lead bearing weight loss of 18.6 milligrams.

Further illustration of the usefulness of the products of this invention as corrosion and oxidation inhibitors is shown by the results of a rust test, i.e., modified ASTM procedure D665–54. This test indicates the ability of lubricating oils to aid in preventing the rusting of ferrous parts should water or other corrosives become mixed with the oil. The test involves immersing a steel rod in 300 ml. of a test lubricant containing 5 milliliters of "acidified" water (prepared by dissolving 10 grams of glacial acetic acid and 10 grams of concentrated sulfuric acid per liter of water), agitating the lubricant at 140° F., removing the rod after 5 hours of testing and cleaning it by dipping in benzene and then in acetone, drying the rod, coating the rod with a clear lacquer to fix the rust, and inspecting the rod for rusting. The duration of this test is 5 hours and, as indicated above, the rod is then evaluated for rust (on a scale of 10–0, 10 being indicative of no rust and 0 being indicative of extremely heavy rusting). The utility of the compositions of this invention with respect to the above test is shown by testing Example B which scored 10.

To further illustrate the utility of the compositions of this invention as additives in lubricating compositions, an oxidation and detergency test is run in which a 350 cc. sample of a lubricant containing 1.5% by weight of the solvent-free additive is placed in a 2 x 15 (inches) borosilicate tube. A 1⅜ x 5⅞ (inches) SAE 1020 steel panel is immersed in the above oil composition. Thereupon, the sample is heated at 300° F. for 96 hours while air is bubbled through the sample at the rate of 10 liters per hour. The oxidized sample is cooled to 120° F., homogenized with 0.5% of water and allowed to stand at room temperature for 24 hours. Thereupon, the sample is filtered through two layers of No. 1 Whatman filter paper 20 mm. Hg pressure. The precipitate is washed with naphtha and dried and is then weighed. The resulting weight is taken as a measure of the effectiveness of the additive to inhibit oxidation and disperse the sludge formed during the test. The greater the weight of the precipitate the less effective the additive. The base oil of the lubricant sample employed in this test is a Mid-Continent, conventionally refined mineral oil having a viscosity of about 180 SUS at 100° F. The results of the test are indicated in the following table (Table II).

TABLE II

| Product of this invention: | Sludge (mg. per 100 cc. of sample) |
|---|---|
| None | 800–1200 |
| Product of Example 3 | 27.4 |
| Product of Example 7 | 10.4 |
| Product of Example 9 | 6 |
| Product of Example 11 | 102 |

What is claimed is:

1. A process for preparing an oil-soluble nitrogen-containing metal salt composition comprising reacting, at a temperature within the range of from about 20° C. to about 250° C., (A) about two equivalents of a succinic compound selected from the class consisting of hydrocarbon-substituted succinic acids and hydrocarbon-substituted succinic anhydrides wherein the hydrocarbon substituent has at least about 50 aliphatic carbon atoms, *with* (B) about one equivalent of a basic metal reactant selected from the class consisting of alkali metal, alkaline earth metal, lead, cadmium and zinc oxides, hydroxides, carbonates and lower alcoholates and the successive combination of an alkali metal hydroxide and an inorganic metal salt selected from the class consisting of alkaline earth metal, lead, cadmium, zinc, nickel, and cobalt halides and nitrates, and *subsequently with* (C) from one to about five equivalents of an amine selected from the class consisting of alkylene polyamines and hydroxyalkyl-substituted alkylene polyamines having up to about eight carbon atoms in the alkylene radical and up to about six carbon atoms in the hydroxyalkyl substituent.

2. A process for preparing an oil-soluble nitrogen-containing metal salt composition comprising reacting, at a temperature within the range of from about 60° C. to about 250° C., (A) one equivalent of a mono-metal salt of a hydrocarbon-substituted succinic acid in which the hydrocarbon substituent has at least about 50 aliphatic carbon atoms and the metal of said metal salt is a metal selected from the class consisting of alkali metal, alkaline earth metal, zinc, cadmium, nickel, cobalt and lead, with (B) from about one to about five equivalents of an amine selected from the class consisting of alkylene polyamines and hydroxyalkyl-substituted alkylene polyamines having up to about eight carbon atoms in the alkylene radical and up to about six carbon atoms in the hydroxyalkyl substituent.

3. A process for preparing an oil-soluble nitrogen-containing metal salt composition comprising (A) mixing *about two equivalents of* a succinic compound selected from the class consisting of hydrocarbon-substituted succinic acids and hydrocarbon-substituted succinic anhydrides wherein the hydrocarbon substituent has at least about 50 aliphatic carbon atoms, with [from] about one [to about five] equivalent[s] of an amine selected from the class consisting of alkylene polyamines and hydroxyalkyl-substituted alkylene polyamines having up to about eight carbon atoms in the alkylene radical and up to about six carbon atoms in the hydroxyalkyl substituent, and heating the resulting mixture at a temperature sufficient to effect acylation and to form an acylated amine, and to remove the water formed thereby, and then (B) mixing said acylated amine with about one equivalent of a basic metal compound selected from the class consisting of alkali metal, alkaline earth metal, zinc, cadmium and lead oxides, hydroxides, carbonates and lower alcoholates, and heating the resulting mixture at a temperature within the range of from about 20° C. to about 250° C.

4. The process of claim 2 wherein the mono-metal salt of a hydrocarbon-substituted succinic acid is prepared by the double decomposition of an alkali metal succinate and an inorganic metal salt selected from the class consisting of alkaline earth metal, lead, cadmium, zinc, nickel, and cobalt halides and nitrates.

5. The process of claim 2 wherein the hydrocarbon substituent of the succinic compound is a radical derived from a polyisobutene having a molecular weight within the range from about 700 to about 100,000.

6. The process of claim 2 wherein the amine is a polyethylene polyamine.

7. A lubricating composition comprising a major proportion of a lubricating oil and from about 0.5% to about 20% by weight of the product of the process of claim 1.

8. A lubricating composition comprising a major proportion of a lubricating oil and from about 0.5% to about 20% by weight of the product of the process of claim 2.

9. A process for preparing an oil-soluble nitrogen-containing zinc salt composition comprising reacting (A) a mono-zinc salt of a polyisobutylene substituted succinic acid in which the molecular weight of the polyisobutylene radical is about 1,000, with (B) one to two equivalents of an alkylene polyamine, having up to about 8 carbon atoms in the alkylene radical at a temperature within the range of from about 80° C. to about 250° C.

10. A lubricating composition comprising a major proportion of a lubricating oil and from about 0.5% to about 20% by weight of the product of the process of claim 9.

11. The product of the process of claim 1.

12. The product of the process of claim 9.

References Cited

The following references, cited by the Examiner, are of record in the patented file of this patent or the original patent.

UNITED STATES PATENTS

| | | | |
|---|---|---|---|
| 3,018,250 | 1/1962 | Anderson et al. | 252—51.5 |
| 3,018,291 | 1/1962 | Anderson et al. | 252—51.5 X |
| 3,087,936 | 4/1963 | Le Suer | 252—51.5 X |

PATRICK P. GARVIN, *Primary Examiner.*